No. 724,061. PATENTED MAR. 31, 1903.
J. A. THOMPSON.
TWINE HOLDER.
APPLICATION FILED MAR. 31, 1902.
NO MODEL.
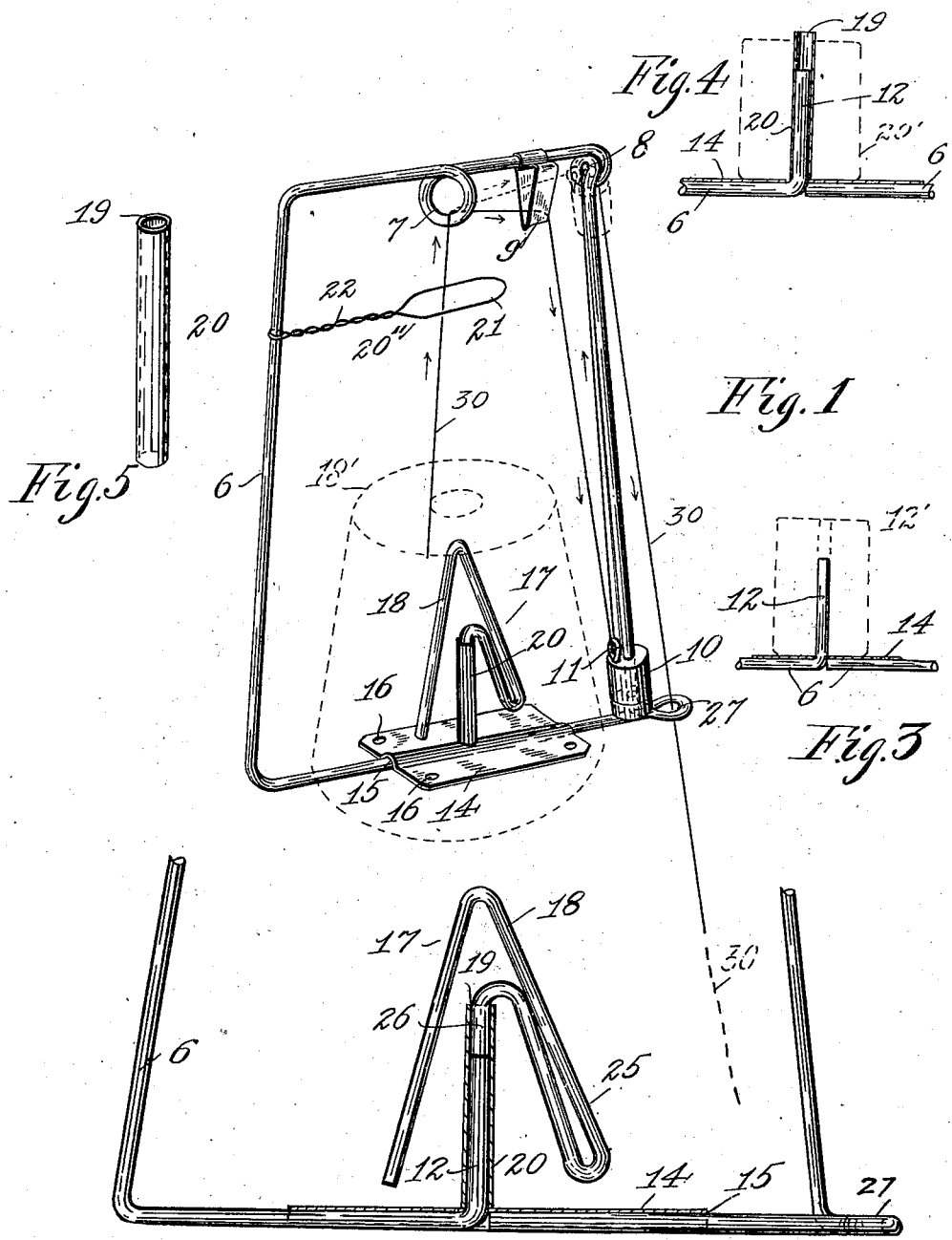
WITNESSES:
William P. Smith
Emily H. Adams
INVENTOR.
John A. Thompson
BY Frank E. Adams
ATTORNEY.

UNITED STATES PATENT OFFICE.

JOHN A. THOMPSON, OF SEATTLE, WASHINGTON.

TWINE-HOLDER.

SPECIFICATION forming part of Letters Patent No. 724,061, dated March 31, 1903.

Application filed March 31, 1902. Serial No. 100,828. (No model.)

*To all whom it may concern:*

Be it known that I, JOHN A. THOMPSON, a citizen of the United States of America, and a resident of the city of Seattle, in the county of King and State of Washington, have invented certain new and useful Improvements in Twine-Holders, of which the following is a specification.

My invention relates to improvements in devices adapted to retain a supply of twine while portions thereof are drawn away for use, and has special reference to improvements in a device of this nature on which Letters Patent No. 666,943 were issued to me by the United States of America on the 29th day of January, 1901.

Among numerous objects attained by this invention and readily understood from the following specification and accompanying drawings included as a part thereof is the production of an efficient and convertible twine-retaining device which incorporates essential features of utility and its embodiment with the holder in a most simple and inexpensive manner and the production of a simplified twine-guard embodying essential features of adaptability which insures delivery of the twine as desired.

The above-mentioned and other objects equally as desirable are attained by the constructions, combinations, and arrangements of parts as disclosed on the drawings, set forth in this specification, and succinctly pointed out in the appended claims.

With reference to the drawings filed herewith and bearing similar reference characters for corresponding parts throughout, Figure 1 is a perspective view of my improved twine-holder, disclosing in bold lines the position of the several parts of the device and the twine when the free end thereof has been retracted and by broken lines the position of the twine-cone and also the free end of the twine when drawn for use. Fig. 2 is a side elevation of the lower portion of the frame of the holder on large scale, with the base-plate and the core of the retaining device indicated in longitudinal sections. Fig. 3 is a side view, on reduced scale, of the central portion of the base, with the plate thereof in longitudinal section and the stud of the twine-retaining device with a twine-spool indicated by broken lines in relative position. Fig. 4 is a similar view to Fig. 3, but shows the core of the twine-retaining device on the stud and a spool of twine indicated by broken lines in relative position; and Fig. 5 is a perspective view of the core detached.

In the present embodiment of this invention I employ an open frame, as 6, of substantially rectangular form, the upper portion of which is preferably of the same shape as the one described in my aforesaid patent and includes a loop 7 midway the length of the upper side and an eye 8 at one adjacent corner. This loop and the eye are conveniently formed by bending the wire comprising the frame to the desired shape at these points and are adapted as guides for the twine, as 30, and a tension-crotch, as 9, of any suitable construction, is conveniently secured to the frame at a point intermediate said guides, and a weight, as 10, adapted to retract the free end of the twine, is slidably engaged with the adjacent vertical side of the frame and has a suitable eye, as 11, adapted to receive the twine between the tension-crotch and guide 8. As now considered frame 6 is composed of a single piece of wire bent to an open and preferably rectangular form, with the ends of the wire brought closely adjacent to each other substantially midway the bottom side of the frame, and a portion of one of said ends is bent inwardly to form a projecting stud, as 12, which is preferably of suitable length to offer support to a spool, ball of twine, or the like, as 12′, having a comparatively small bore. In the present instance a base-plate 14 is incorporated with the frame as suitable means whereby it may be secured to a counter, wall, or the like, and consists of a substantially rectangular section of thin sheet metal bent midway to form a groove, as 15, along one side surface, which is adapted to receive the wire of which frame 6 is formed, and the plate as now included is positioned where the ends of this wire are brought together and has a suitable centrally-located aperture, through which the stud 12 projects, and also screw-apertures, as 16, adjacent the corners, adapted to receive wood-screws or the like, by which the frame may be secured in place. This plate is preferably secured to the frame by running solder in the groove 15 after the ends of the wire are placed therein and is thus made to strengthen the frame and serve to support same in place when positioned on a counter or the like and also to steady the supply of twine when the frame is suspended.

To conveniently accommodate the holder to various forms of twine balls, spools, and cones, I have provided a convertible twine-retaining device 17, which as now included incorporates a standard 18, embodying features covered in my aforesaid former patent, and comprises an adjustable device adapted to be expanded or contracted to fit it to the bores of different diameters as occurring in the cores or twine-cones or the like. This standard preferably comprises a single piece of wire of resilient nature, which is bent to inclose an acute angle, and one end thereof is also bent inwardly and then downwardly to conveniently form a vertically-disposed stem, as 26, by which it is supported in the holder, and the inwardly-bent portion is preferably extended upwardly substantially parallel the adjacent leg of the standard to a point adjacent the apex before it is bent downwardly and is thus made to conveniently bring the standard close to the base 14, as now desired, and adapt it for support by a suitable socket, as 19, which is conveniently incorporated as the upper end of a tubular core 20 of somewhat greater length than the stud 12, and which is formed with a bore of suitable size to snugly fit upon said stud and is thereby conveniently removably mounted in the holder. This core is preferably rendered cylindrical, with a smooth periphery and of a diameter which adapts it as a core for twine-balls or the like, as 20', having a hole or bore whose diameter is intermediate those which the stud and standard are respectively designed to accommodate, and a plurality of these cores may be used, if desired, and may be placed in the twine-balls after they are wound or comprise the core about which the twine is gathered as the ball is formed. As the standard 18 is now mounted both legs thereof are left free to open and close and are yieldingly forced apart by the resiliency of the wire of which the standard is formed. This construction permits of ready placement of the twine-cone or the like by simply partly closing the legs and then placing the standard in the bore of the cone, when the legs are released, and they open against the walls of said bore, and thereby serve to securely retain the cone in place. In the present embodiment this standard is composed of a wire of comparatively small diameter, and its rigidity is increased by bending the end portion of one leg, as 25, back upon itself to conveniently render this leg of sufficient stiffness to properly support the standard and serve as means by which the stem 26 is rigidly connected thereto.

The reference character 20'' indicates an improved guard which is adapted to prevent the twine from looping about the frame of the holder as drawn from the supply, and this guard is conveniently rendered in the form of a finger, and preferably projected over the base 14 and located at a point intermediate said supply and the guide 7. As now considered the guard is formed with an eye 21, through which the twine passes, and a stem connected thereto, composed of suitable resilient material, adapted as the preferred means to yieldingly hold the eye of the guard in normal position, and the free end thereof is conveniently fixed to the side of the frame 6 by soldering or the like, and the opposite end is left free to vibrate and includes the eye 21, which is preferably positioned concentric the twine cone or ball. In the present instance this guard comprises a single piece of wire of small diameter, which is bent substantially midway its length to inclose the eye 21, and the end portions thereof are then twisted about each other to form the stem 22, and the extremities of these portions are bent about the frame 6 to conveniently secure the guard in place.

The stud 12 is preferably used to retain small balls of twine, as 12', when they are placed in the holder, the core 20 to retain larger balls or spools 20', and the standard 18 to secure cones 18' or the like, having a tapering bore. In either case the free end of the twine 30 is passed upwardly through the eye of guard 20'', then through the guide 7, tension-crotch 9, the eye of weight 10, and then through the guide 8, and should the holder be suspended the twine is preferably finally passed through a loop 27 at the base thereof, which is conveniently formed by bending the wire comprising the frame to the desired shape at this point.

In drawing a piece of twine from the holder the free end is grasped and pulled outwardly. This action first lifts weight 10 to the position indicated by broken lines in Fig. 1, which releases the twine from the tension-crotch, when it can be drawn as desired, and upon release of the free end thereof weight 10 acts to first draw the twine firmly into the crotch of tension 9 and then retract the free end of the twine as it falls to normal position.

Having thus described my invention, what I claim, and desire to secure by Letters Patent of the United States, is—

1. In a twine-holder; a frame comprising a single piece of wire bent to open form, and having one end thereof bent inwardly to form a stud, a base adapted to straddle the rim upon each side of the stud and a central projecting sleeve surrounding the stud, substantially as and for the purpose specified.

2. In a twine-holder; a frame comprising a single piece of wire bent to a substantially rectangular form and having the ends of the wire brought closely adjacent each other and one end bent inwardly to form a stud, a base adapted to straddle the rim upon each side of the stud and a central projecting sleeve surrounding the stud.

3. In a twine-holder; a frame comprising a single piece of wire bent to substantially rectangular form and bent to form a loop midway one side and an eye at one corner adjacent said loop and having the ends of the wire brought closely adjacent each other opposite said loop and one end bent inwardly to form a stud, a base adapted to straddle the rim upon each side of the stud and a central projecting sleeve surrounding the stud.

4. In a twine-holder; the combination of a frame having a wire extended across one side; of a plate for securing said frame in place consisting of a substantially broad section of thin sheet metal bent substantially midway to form a groove to receive said wire.

5. In a twine-holder; the combination with a projecting stud of equal size in cross-section throughout its length; of a detachable core bored to slidably fit said stud snugly, a removable ball-holding standard fitting in the upper end of said core, and a base supporting the core and surrounding the lower end of the stud.

6. In a twine-holder; the combination with a projecting stud supported in the holder; of a detachable core bored at one end to fit said stud and having the opposite end arranged as a socket, a detachable standard having a stem fitting said socket, and a base supporting the core and surrounding the stud at its base.

7. In a twine-holder; the combination with a projecting stud erected at the base; of a core comprising a tubular section of greater length than the stud and adapted to receive the same and a standard for a twine-cone or the like having a stem fitting the projecting end of said section, and a base surrounding the base of the stud and supporting the core.

8. In a twine-holder; a convertible twine-retaining device, consisting of a projecting stud connected to the frame of the holder, a tubular core of greater length than the stud and removably fitting thereover, a standard having a stem removably fitting the projecting end of said core, and a base straddling the holder and surrounding the base of the stud and supporting the core, whereby said stud, core or standard may be used to retain a supply of twine.

9. In a twine-holder; the combination with a projecting stud arranged in the holder; of a detachable tubular core fitting over said stud and a detachable standard comprising legs connected together at one extremity and normally yieldingly forced apart and having a stem adapted to fit the opposite end of said core, and a base straddling the holder and surrounding the base of the stud and supporting the core.

10. In a twine-holder; the combination of a suitable frame consisting of a single piece of wire bent to open form and having the ends brought closely adjacent each other at one side, a stud formed on one extremity and a core surrounding said stud; of an adjustable standard to retain a twine-cone or the like, comprising legs connected together at one extremity and normally yieldingly forced apart, and means to connect the opposite end of one of said legs to one end of the wire comprising said frame.

11. In a twine-holder having its ends bent inward toward each other and terminating in a central part, an upwardly-projecting stud carried by the extremity, and a suitable base straddling both extremities and surrounding the stud; an adjustable standard for twine-cones, comprising legs of resilient material united at the upper extremities, diverging downwardly and adapted to spread apart or to be closed at the lower extremities, a stem connected to said standard and a socket arranged on said base to receive the said stem and incase said stud.

12. In a twine-holder, the combination of a substantially rectangular frame, a base spanning the central lower part of said frame, a core 20, at right angles to the base and projecting upward therefrom, and a twine-retaining device 17, having its lower terminal mounted in the upper end of said core its body bent to form a leg 25, and another leg, said legs projecting down upon opposite sides of the core and forming a triangular rest for the ball of twine.

Signed at Seattle, Washington, this 15th day of February, 1902.

JOHN A. THOMPSON.

Witnesses:
W. PARRY SMITH,
C. A. MCKENZIE.